3,020,286
CALCIUM NICOTINATE IODIDE
Edgar A. Ferguson, Jr., 150 Woodruff Ave.,
Brooklyn, N.Y.
No Drawing. Filed Aug. 24, 1960, Ser. No. 51,594
3 Claims. (Cl. 260—295.5)

This invention relates to a new and useful improvement in iodide compositions.

The particular group of iodide compositions herein described is characterized by calcium nicotinate iodide. This compound is an alterative useful in the treatment of vascular changes due to arteriosclerosis.

The main object of this invention is to provide a new and useful composition for safe iodide treatment. Another object of the invention is to provide the means for manufacture of the said composition.

Nicotinic acid is pyridine-3-carboxylic acid. Calcium may be provided for the formation of this compound in the form of its salts such as calcium carbonate, $CaCo_3$, calcium hydroxide, $Ca(OH)_2$. Iodine is provided in the form of hydroiodic acid (HI). The formula of the compound is $Ca(I)OOCR$, wherein R is the pyridine ring.

The following examples are meant to illlustrate some of the methods of manufacture and are not presented for any purpose of limiting the scope and spirit of the invention as delineated in the specifications and claims. Other methods will be apparent to one skilled in the art.

*Example 1*

To 10 grams of calcium carbonate in a fine suspension in 100 ml. of water at 40° C., add 24.6 grams of nicotinic acid slowly while thoroughly stirring the mixture. As soon as the entire mixture becomes clear add 12.8 grams (supplied as a w./v. percentage solution in water) hydroiodic acid in a 10% solution of water slowly with stirring at 40° C. Allow this reaction mixture to stand for 24 hours at 35° C. The mixture of calcium nicotinate iodide and nicotinic acid is then cooled to 15° C. To this solution add 200 ml. of isopropyl alcohol and 20 ml. of ethyl ether. The calcium nicotinate iodide is precipitated and the nicotinic acid remains in solution from which it may be recovered.

*Example 2*

Take 102 grams of anhydrous calcium methylate or 130 grams of calcium ethylate and add 123 grams of anhydrous nicotinic acid. Warm to 20° C. in a reflux apparatus with gentle stirring. The reflux apparatus was provided with a drying tube at the opening. After warming and stirring for a sufficient time to render the solution clear (approximately 10 minutes) add a metered quantity of gaseous hydroiodide. The quantity by weight of hydroiodide used was 128 grams. Calcium nicotinate iodide is precipitated and may be separated from the alcohol by filtration and drying.

*Example 3*

Take 10 grams of calcium carbonate suspended in 50 ml. of water at 15° C. With constant stirring add 12 grams of nicotinic acid in a 10% solution of water at the same temperature. When the solution becomes clear (in about ½ hr.), providing there has been no evolution of gas, add 13 grams of hydroiodic acid in a w./v. percentage solution in water at a temperature of 25° C. The reaction is complete when bubbles are no longer formed in the solution. The calcium nicotinate iodide is precipitated from the solution by adding isopropyl alcohol containing 10% ethyl ether.

*Example 4*

Take 57 grams of calcium hydroxide in 150 ml. of $CO_2$-free water. Add 123 grams nicotinic acid dropwise with stirring in a 50% solution of water which has been rendered $CO_2$-free taking precaution to exclude $CO_2$ from the air surrounding the reaction mixture. The mixture is thoroughly stirred during the reaction with nicotinic acid by a magnetic stirring mechanism. Following the addition of nicotinic acid add, under the same conditions, 128 grams of hydroiodic acid in a w./v. gaseous solution. The calcium nicotinate iodide is precipitated by adding an equal volume of isopropyl alcohol with 10% ethyl ether.

*Example 5*

Silver nicotinate was prepared by the reaction of nicotinic acid on silver ammonia complex or by the reaction of nicotinic acid on freshly precipitated moist silver oxide. To 23 grams of silver nicotinate suspended in 50 ml. of water add 14.5 grams of calcium iodide dissolved in 50 ml. of water dropwise with constant stirring. The precipitate is filtered off and the supernatant fluid contains calcium nicotinate iodide. This may be separated by precipitating with an equal volume of isopropyl alcohol containing 10% ethyl ether.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Calcium nicotinate iodide.
2. Method for the preparation of calcium nicotinate iodide comprising substantially the steps of reacting one mol of calcium carbonate with one mol of nicotinic acid in aqueous media; and reacting the formed reaction product with hydroiodic acid, thereby forming calcium nicotinate iodide.
3. Method for the preparation of calcium nicotinate iodide comprising substantially the steps of reacting one mol of an aqueous solution of nicotinic acid dropwise to one mol of suspended calcium carbonate solution in a cool aqueous phase, allowing to stand and adding one mol of hydroiodic acid in aqueous solution under the same conditions, and precipitating the formed salt by saturation of the aqueous phase with an alcohol ether solution.

References Cited in the file of this patent
UNITED STATES PATENTS
1,938,253   Hartmann et al. _____ Dec. 5, 1933

OTHER REFERENCES
Turnau: Beilstein's Handbuch (4th ed.), vol. 22, page 39 (1935).